(12) United States Patent
Sausse et al.

(10) Patent No.: US 7,559,199 B2
(45) Date of Patent: Jul. 14, 2009

(54) VARIABLE-NOZZLE CARTRIDGE FOR A TURBOCHARGER

(75) Inventors: Lorrain Sausse, Charmes (FR); Raphael Hettinger, Hadol (FR); Dominique Petitjean, Thaon les Vosges (FR); Gary Agnew, Thaon les Vosges (FR); Philippe Arnold, Thaon les Vosges (FR); Emmanuel Severin, Thaon les Vosges (FR); Manual Dufin, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 228 days.

(21) Appl. No.: 11/534,348

(22) Filed: Sep. 22, 2006

(65) Prior Publication Data

US 2008/0075582 A1    Mar. 27, 2008

(51) Int. Cl.
*F02D 23/00* (2006.01)
*F01D 17/16* (2006.01)
*F02C 6/12* (2006.01)
*F04D 29/44* (2006.01)

(52) U.S. Cl. .................. 60/602; 415/159; 415/163; 415/164

(58) Field of Classification Search .............. 60/602; 415/159–164
See application file for complete search history.

(56) References Cited

U.S. PATENT DOCUMENTS

| 2,860,827 A  | * 11/1958 | Egli            | 415/164 |
| 4,643,640 A  |   2/1987  | Burdette et al. | 415/164 |
| 5,207,565 A  | *  5/1993 | Roessler        | 417/407 |
| 5,964,574 A  | * 10/1999 | Meier et al.    | 415/110 |
| 6,916,153 B2 | *  7/2005 | Boening         | 415/163 |
| 6,951,450 B1 | * 10/2005 | Figura et al.   | 415/164 |
| 7,322,791 B2 | *  1/2008 | Stilgenbauer    | 60/602  |
| 2005/0252210 A1 | 11/2005 | Shiraishi et al. | 60/602 |

FOREIGN PATENT DOCUMENTS

| WO | 2004022926        | 3/2004  |
| WO | 2004035991        | 4/2004  |
| WO | 2004109063        | 12/2004 |
| WO | WO 2007046798 A1 * | 4/2007 |

OTHER PUBLICATIONS

A translation copy of WO 2004/109063 A1.*
PCT/ISR-WO (PCTUS2007/079106).

* cited by examiner

*Primary Examiner*—Thai Ba Trieu
(74) *Attorney, Agent, or Firm*—Alston & Bird, LLP

(57) ABSTRACT

A variable-nozzle turbocharger includes a cartridge containing a variable vane mechanism connected between the center housing and the turbine housing. The cartridge comprises an annular nozzle ring supporting an array of rotatable vanes, an insert having a tubular portion sealingly received into the bore of the turbine housing and having a nozzle portion extending radially out from one end of the tubular portion and being axially spaced from the nozzle ring with the vanes therebetween, and a plurality of spacers connected between the nozzle portion of the insert and the nozzle ring. The turbine housing has a surface that directly contacts a surface of the nozzle ring that axially faces the insert for axially locating the nozzle ring relative to the turbine housing. A radial gap is defined between the turbine housing and the nozzle ring to allow radial movement of the nozzle ring relative to the turbine housing.

23 Claims, 7 Drawing Sheets

US 7,559,199 B2

VARIABLE-NOZZLE CARTRIDGE FOR A TURBOCHARGER

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The variable vane mechanism is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to thermal stresses because of this temperature gradient.

The assignee of the present application has previously addressed the issues noted above by providing a variable-nozzle turbocharger that includes a cartridge containing the variable vane mechanism, as described in co-pending application PCT/US2005/37622 assigned to the assignee of the present application. The turbine defines a nozzle through which exhaust gas is delivered to the turbine wheel, and a central bore through which exhaust gas is discharged after it passes through the turbine wheel. The cartridge is connected between the center housing and the turbine housing and comprises an assembly of a generally annular nozzle ring and an array of vanes circumferentially spaced about the nozzle ring and rotatably mounted to the nozzle ring and connected to a rotatable actuator ring such that rotation of the actuator ring rotates the vanes for regulating exhaust gas flow to the turbine wheel. The cartridge also includes an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion. A plurality of spacers are connected between the nozzle portion of the insert and the nozzle ring for securing the nozzle ring to the insert and maintaining an axial spacing between the nozzle portion of the insert and the nozzle ring. The cartridge further comprises a generally annular retainer ring fastened to the center housing in such a manner as to capture the nozzle ring between the retainer ring and the center housing, the retainer ring being formed as a separate part from the insert and being mechanically and thermally decoupled from the insert.

The cartridge described in the aforementioned PCT application is effective for providing stress decoupling of the variable vane mechanism. However, it is desired to reduce the overall size of the turbocharger while retaining the stress decoupling advantages of the cartridge design.

BRIEF SUMMARY OF THE INVENTION

The present invention addresses the above needs and achieves other advantages, by providing a variable-nozzle a cartridge for a turbocharger containing the variable vane mechanism. The turbine defines a nozzle through which exhaust gas is delivered to the turbine wheel, and a central bore through which exhaust gas is discharged after it passes through the turbine wheel. The cartridge is connected between the center housing and the turbine housing and comprises an assembly of:

a generally annular nozzle ring and an array of vanes circumferentially spaced about the nozzle ring and rotatably mounted to the nozzle ring and connected to a rotatable actuator ring such that rotation of the actuator ring rotates the vanes for regulating exhaust gas flow to the turbine wheel, wherein the nozzle ring includes a radially outer surface facing a radially inner surface of the turbine housing, and wherein a radial gap is defined between the radially outer surface of the nozzle ring and the radially inner surface of the turbine housing, the radial gap allowing radial displacement of the radially outer surface of the nozzle ring relative to the turbine housing;

an insert having a tubular portion sealingly received in the bore of the turbine housing and having a nozzle portion extending generally radially out from one end of the tubular portion, the nozzle portion being axially spaced from the nozzle ring such that the vanes extend between the nozzle ring and the nozzle portion; and a plurality of spacers connected between the nozzle portion of the insert and the nozzle ring for securing the nozzle ring to the insert and maintaining an axial spacing between the nozzle portion of the insert and the nozzle ring.

In accordance with some embodiments of the invention, the turbine housing includes a surface that directly contacts a surface of the nozzle ring that axially faces toward the insert for axially locating the nozzle ring relative to the turbine housing and for sealing the interface between the nozzle ring and turbine housing. The nozzle ring is structured and arranged relative to the center housing such that radial locating of the nozzle ring is performed by the center housing, or by a member arranged intermediate the nozzle ring and center housing.

Thus, the retainer ring of the prior cartridge design is eliminated, which allows the diameter of the turbine housing to be reduced by a significant amount. This provides a smaller package and enables the cost of the turbocharger to be reduced.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
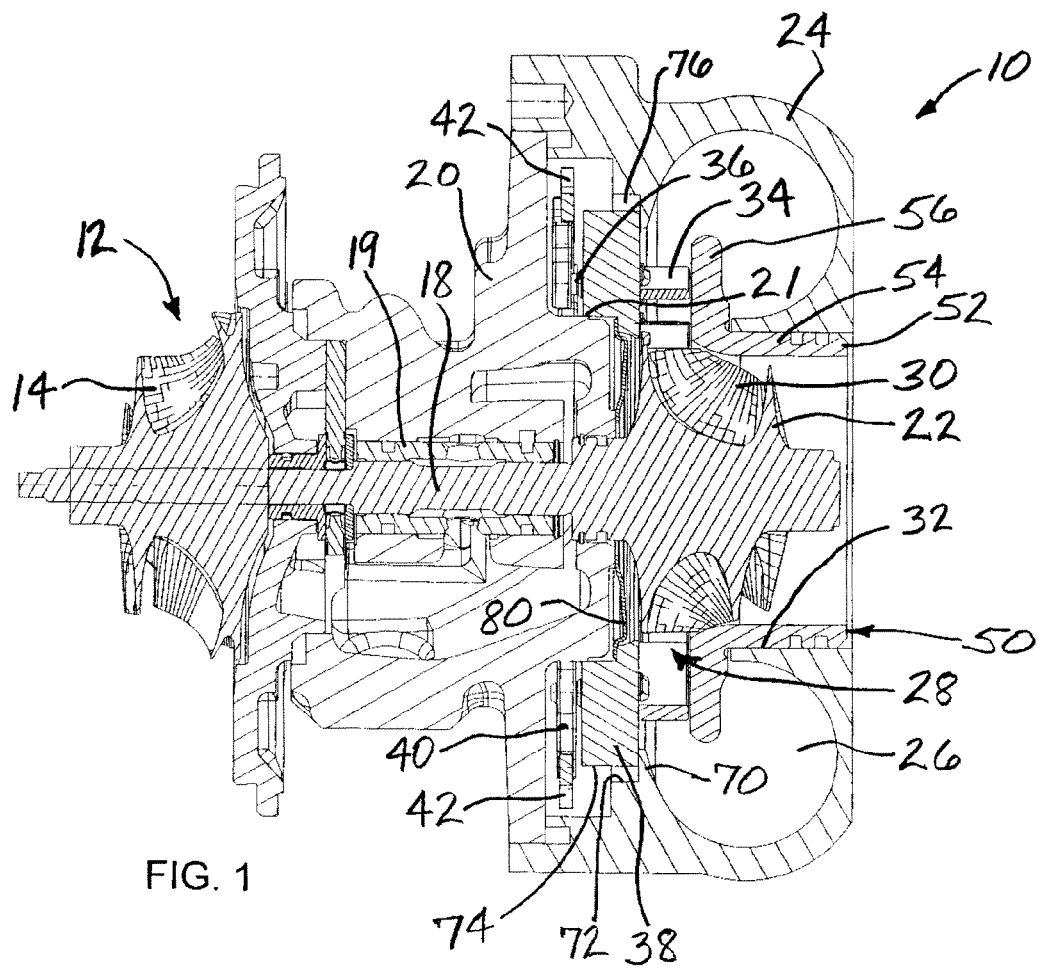
FIG. 1 is a fragmentary sectioned side view of a turbocharger in accordance with a first embodiment of the invention.

A turbocharger 10 in accordance with one embodiment of the invention is illustrated in fragmentary perspective view in FIG. 1. The turbocharger comprises a compressor 12 having a compressor wheel or impeller 14 mounted in a compressor housing (not shown) on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to a pin 36 that passes through an aperture 37 (FIG. 2) in a generally annular nozzle ring 38 that is mounted coaxially with respect to the turbine wheel 22. Each pin 36 is rotatable about its axis within the associated aperture in the nozzle ring so that the vane can rotate about the axis for varying the setting angle of the vane. The nozzle ring 38 forms one wall of the flow passage of the nozzle 28. Each of the pins 36 has a vane arm 40 affixed to an end of the pin that protrudes out from the nozzle ring 38, and is engaged by a generally annular unison ring 42 (also referred to herein as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins 36 to rotate about their axes, thereby rotating the vanes 34 so as to adjust the vane setting angles and thereby vary the cross-sectional flow area through the nozzle 28.

Figure 2:
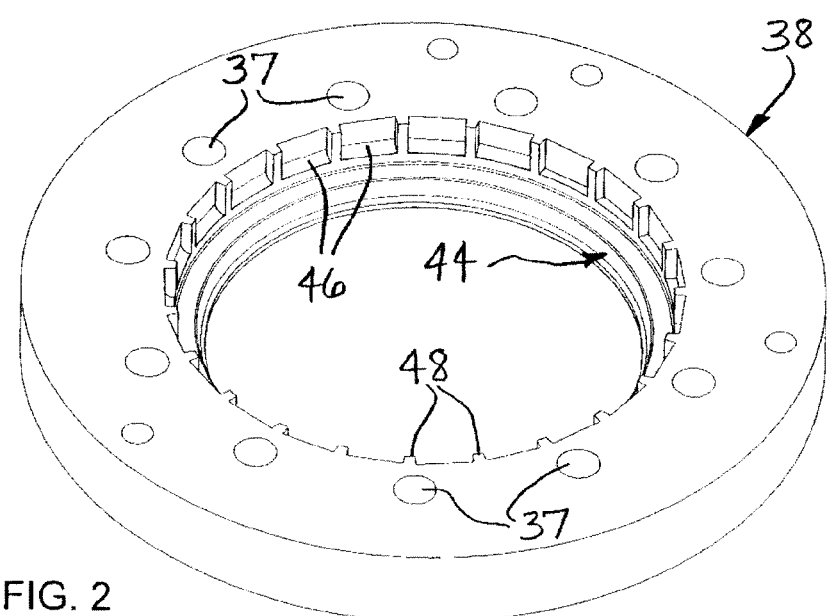
FIG. 2 is an isometric view of the nozzle ring of the first embodiment.

With reference to FIG. 2, the nozzle ring 38 has a radially inwardly facing surface 44 that engages a radially outwardly facing surface 21 (FIG. 1) of the center housing 20 to radially locate the nozzle ring relative to the center housing. The contact between the nozzle ring and center housing can be over less than a full circumference of the center housing, in order to reduce thermal transfer between the nozzle ring and center housing. For example, as shown in FIG. 2, the radially inwardly facing surface 44 of the nozzle ring can include a plurality of circumferentially spaced recesses 46 such that contact between the nozzle ring and center housing occurs only at the surfaces 48 between the recesses 46. Thus, in this embodiment, the nozzle ring 38 is directly centered on the center housing 20, which facilitates accurate concentricity between the nozzle ring and center housing.

With reference again to FIG. 1, the variable vane mechanism is provided in the form of a cartridge 50 that is installable into and removable from the turbocharger as a unit. The cartridge 50 comprises the nozzle ring 38, vanes 34, pins 36, vane arms 40, and unison ring 42. The cartridge further comprises an insert 52 that has a tubular portion 54 sealingly received into the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The radially outer surface of the tubular portion 54 has at least one circumferential groove, and preferably has two axially spaced grooves as shown in FIG. 1, in each of which a sealing ring (not shown) is retained for sealingly engaging the inner surface of the bore 32. Advantageously, the outer diameter of the tubular portion 54 of the insert is slightly less than the inner diameter of the bore 32 so that a slight gap is defined therebetween, and only the sealing rings 58 make contact with the inner surface of the bore 32. Additionally, there is a gap between the nozzle portion 58 and the adjacent end of the turbine housing at the end of the bore 32. In this manner, the insert 52 is mechanically and thermally decoupled from the turbine housing 24.

A plurality of spacers (not shown) are connected between the nozzle portion 56 of the insert 52 and the nozzle ring 38 for securing the nozzle ring to the insert and maintaining the desired axial spacing between the nozzle portion of the insert and the nozzle ring. Each spacer passes through an aperture in the nozzle portion 56 and has an enlarged head on the side of the nozzle portion 56 that faces away from the nozzle 28. Each spacer also has a pair of enlarged shoulders axially spaced along the length of the spacer such that one shoulder abuts the opposite side of the nozzle portion 56 and the other shoulder abuts the facing surface of the nozzle ring 38, thereby setting the axial spacing between the nozzle ring and nozzle portion. An end portion of each spacer passes through an aperture in the nozzle ring 38 and the distal end of this end portion is upset to form an enlarged head to capture the nozzle ring. Advantageously, the spacers are formed of a material having good high-temperature mechanical properties and a relatively low thermal conductivity, such as stainless steel (e.g., grade 310 stainless steel) or the like, so that the nozzle ring 38 and insert 52 are effectively thermally decoupled from each other.

The turbine housing 24 has an annular radially inwardly extending projection 70 that engages the surface of the nozzle ring 38 facing axially toward the insert 52. The engagement between the projection 70 and the nozzle ring 38 preferably is along a full 360° circumference of the nozzle ring so as to substantially seal the interface between the turbine housing and the nozzle ring. The projection 70 also assists the spacers in restraining the nozzle ring with respect to axial movement in the direction toward the insert 52. Advantageously, the turbine housing 24 has a radially inner surface 72 facing toward a radially outer surface 74 of the nozzle ring 38, and the turbine housing surface 72 is greater in diameter than the nozzle ring surface 74 such that there is a gap 76 between these surfaces. The gap 76 accommodates radial displacement of the nozzle ring relative to the turbine housing, such as may occur through differential thermal growth or other causes. This provides an effective stress decoupling of the variable vane cartridge 50 from the turbine housing.

The cartridge 50 can include a heat shroud 80 that is captively retained between the nozzle ring 38 and the center housing 20 when the cartridge is installed onto the center housing. The heat shroud 80 provides sealing between the nozzle ring and center housing to prevent hot exhaust gas from migrating between these parts into the cavity in which the vane arms and unison ring 42 are disposed. The heat shroud 80 can comprise a generally annular member formed of a resiliently elastic material such as spring steel or the like, and the shroud can be configured so that it is compressed in the axial direction between the nozzle ring 38 and the center housing 20 so that the restoring force of the shroud urges the shroud firmly against surfaces of the nozzle ring and center housing to substantially seal against these surfaces. In particular, as shown in FIG. 1, the heat shroud 80 has a radially outer portion that engages a surface of the nozzle ring that faces axially toward the center housing, and a radially inner portion that engages a surface of the center housing that faces axially toward the nozzle ring. These surfaces of the nozzle ring and center housing compress and elastically deform the heat shroud 80 between them.

Figure 3:
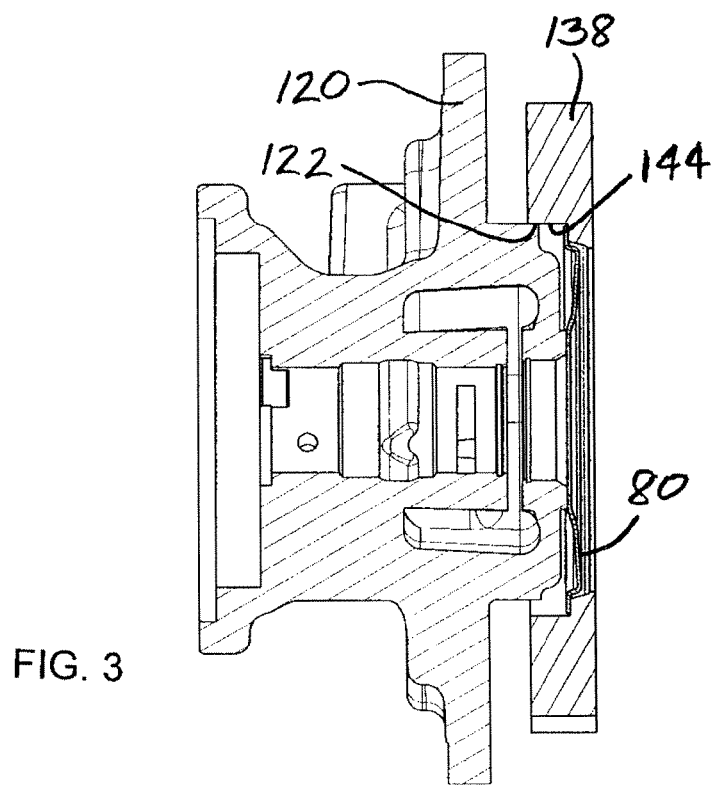
FIG. 3 is a fragmentary sectioned side view of a turbocharger in accordance with a second embodiment of the invention.
Figure 4:
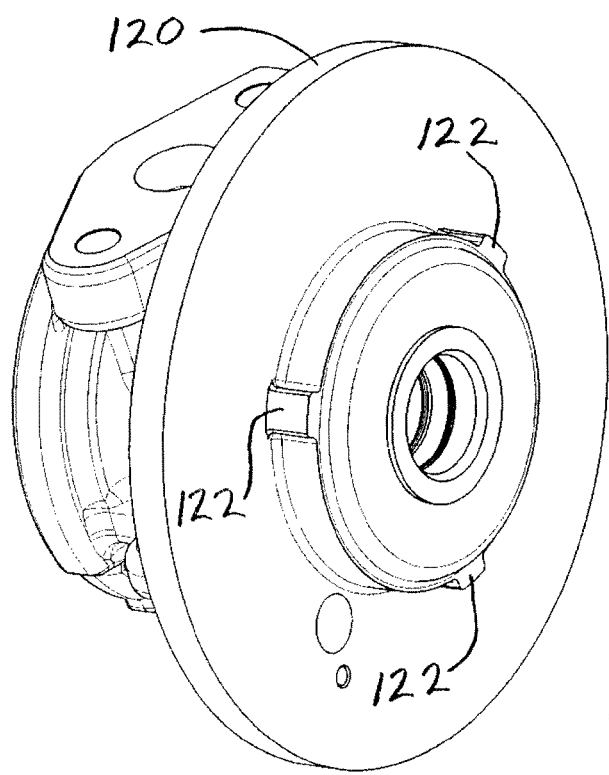
FIG. 4 is an isometric view of the center housing of the second embodiment.

The limited contact area between the nozzle ring 38 and center housing 20 is provided in the above-described first embodiment by configuring the nozzle ring with the recesses 46 so that only the surfaces 48 between the recesses contact the center housing's radially outer surface 21. Alternatively, in a second embodiment illustrated in FIGS. 3 and 4, such limited contact area can be provided by configuring the center housing 120 to include a plurality of circumferentially spaced projections 122 that project radially outwardly to contact the radially inwardly facing surface 144 of the nozzle ring 138 and provide radial centering of the nozzle ring relative to the center housing. As in the first embodiment, a heat shroud 80 is elastically deformed by compression between oppositely facing surfaces of the nozzle ring and center housing.

Figure 5:
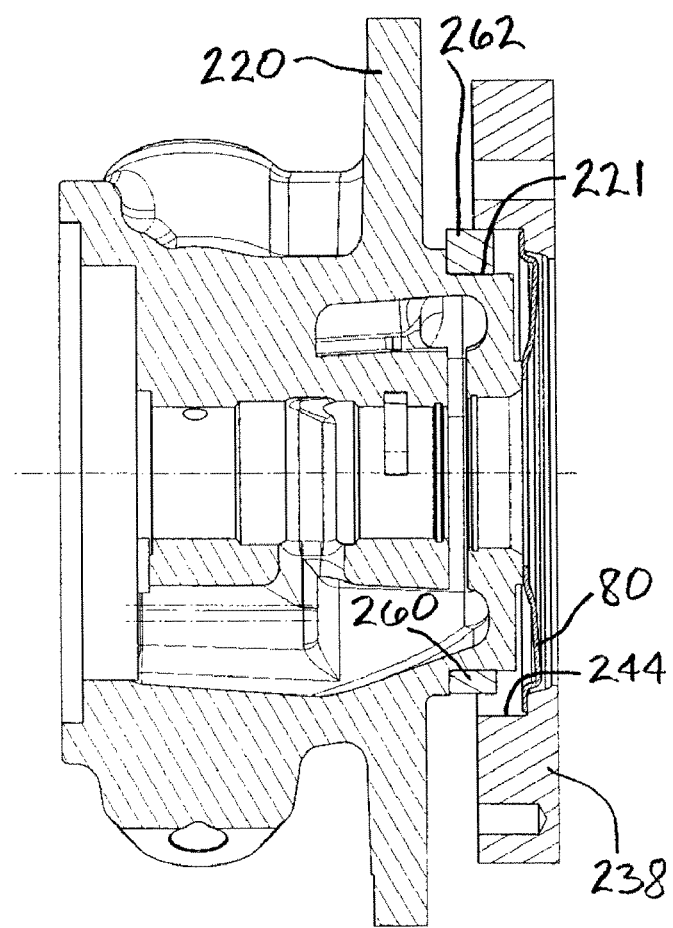
FIG. 5 is a fragmentary sectioned side view of a turbocharger in accordance with a third embodiment of the invention.

The above-described first and second embodiments feature direct contact between the nozzle ring and center housing for centering of the nozzle ring. Alternatively, in a third embodiment depicted in FIGS. 5 and 6, an intermediate ring or sleeve 260 is disposed between the nozzle ring 238 and the center housing 220. More particularly, the sleeve 260 has a radially outer surface on which a plurality of circumferentially spaced, radially outwardly extending projections 262 are formed. The radially inner surface 264 of the sleeve can be a continuous cylindrical surface as shown, or alternatively could include similar projections extending radially inwardly. The projections 262 contact the radially inwardly facing surface 244 of the nozzle ring 238, while the radially inner surface 264 of the sleeve contacts the radially outer surface 221 of the center housing 220. The sleeve is radially centered on the center housing, and the nozzle ring in turn is radially centered on the sleeve. Thus, the nozzle ring is radially centered on the center housing by way of the intermediate sleeve. An elastically deformed heat shroud 80 is included as in the prior embodiments.

Figure 6:
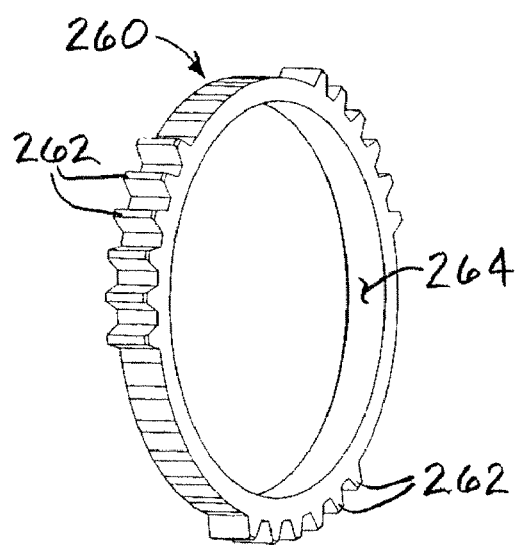
FIG. 6 is an isometric view of an intermediate sleeve arranged between the nozzle ring and center housing of the third embodiment.

The sleeve 260 is illustrated as a continuous 360° ring in FIG. 6. Alternatively, however, the sleeve can be a split ring that is elastically deformable, such as a compensating ring or the like. The split ring can be configured so that in its relaxed state it is larger in diameter than the inner surface of the nozzle ring; the split ring is then compressed radially inwardly to reduce its diameter so that the nozzle ring can be installed about the split ring.

Figure 7:
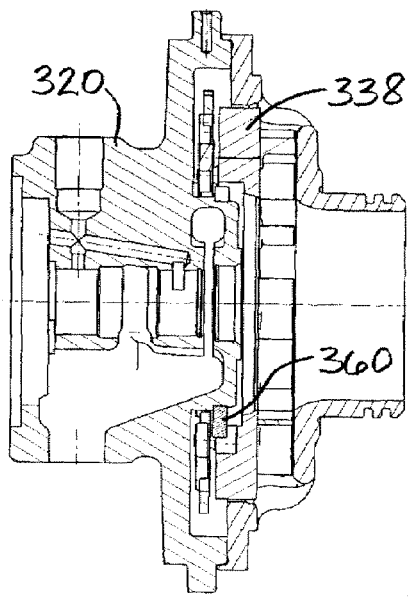
FIG. 7 is a fragmentary sectioned side view of a turbocharger in accordance with a fourth embodiment of the invention, along line 7-7 in FIG. 8.
Figure 8:
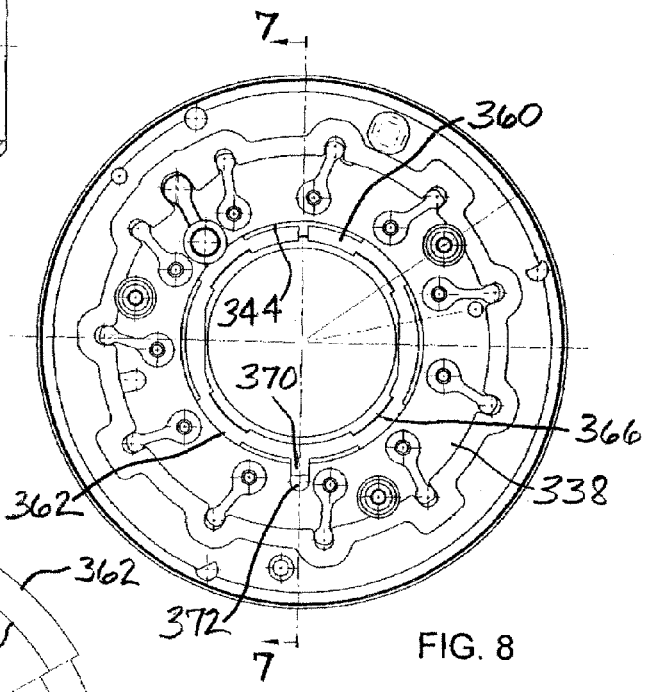
FIG. 8 is a cross-sectional view through the nozzle ring and locating ring of the fourth embodiment.
Figure 9:
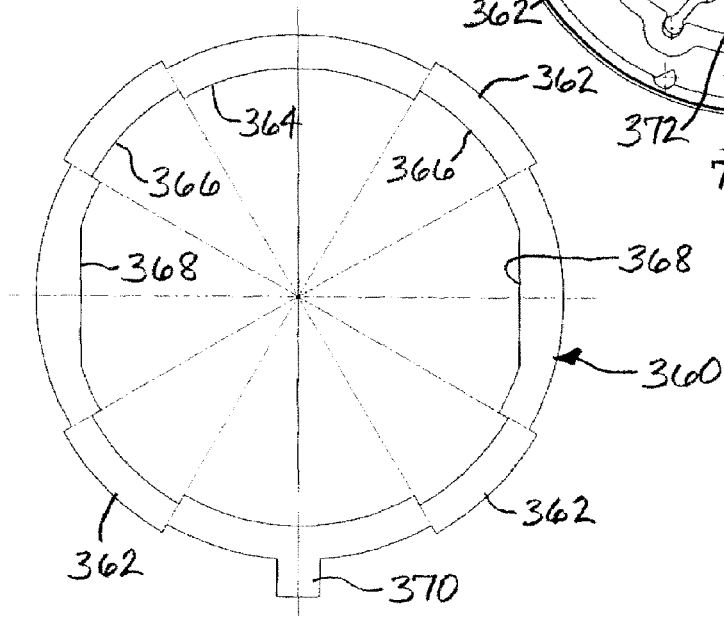
FIG. 9 is a plan view of the locating ring of the fourth embodiment.

A fourth embodiment of the invention is illustrated in FIGS. 7-9. An intermediate locator ring 360 is disposed between the nozzle ring 338 and the center housing 320 for radially centering the nozzle ring relative to the center housing, similar to the third embodiment. Unlike the sleeve of the third embodiment, however, the locator ring 360 also orients the nozzle ring in the circumferential direction relative to the center housing. The locator ring 360 comprises a 360° ring. The radially outer surface of the locator ring defines a plurality of circumferentially spaced projections 362 that project radially outwardly and collectively define a surface that contacts the radially inwardly facing surface 344 of the nozzle ring 338 for radially centering the nozzle ring. The radially inner surface 364 of the locator ring defines a plurality of circumferentially spaced recesses 366 for creating air gaps between the locator ring and center housing. These air gaps, together with the air gaps created between the radially outward projections 362 on the outer surface of the locator ring, help to reduce heat conduction from the nozzle ring through the locator ring to the center housing.

The inner surface 364 of the locator ring 360 also defines two diametrically opposite flats 368 that engage corresponding flats formed on the radially outer surface of the center housing 320 such that the locator ring 364 is located in a predetermined circumferential orientation relative to the center housing.

The radially outer surface of the locator ring further defines a radially outwardly extending protuberance 370 at one circumferential location thereof. The protuberance 370 extends out to a larger radius than the circumferentially spaced projections 362. The radially inner surface of the nozzle ring 338 at one circumferential location thereof defines a recess 372 for receiving the protuberance 370 such that the nozzle ring is oriented in a predetermined circumferential orientation with respect to the locator ring. Accordingly, the nozzle ring is located in a predetermined circumferential orientation relative to the center housing, via the locator ring.

Material requirements for the sleeve or ring embodiments shown in FIGS. 5-9 will be similar. They must be made of a material that have high temperature resistance characteristics and resistance to wear and deformation at these temperatures. Depending on specific applications, acceptable materials can include but are not limited to, austenitic steels in the 300 series, A286 or Inconel materials, and SS310 stainless steel or A286 are preferred choices for current applications. Moreover, in applications expected to encounter particularly high vibrations and wear it might be desirable to add a wear resistant coating to the sleeve or ring, such as by any adapted nitriding process or diffusion hardening process.

Figure 10:
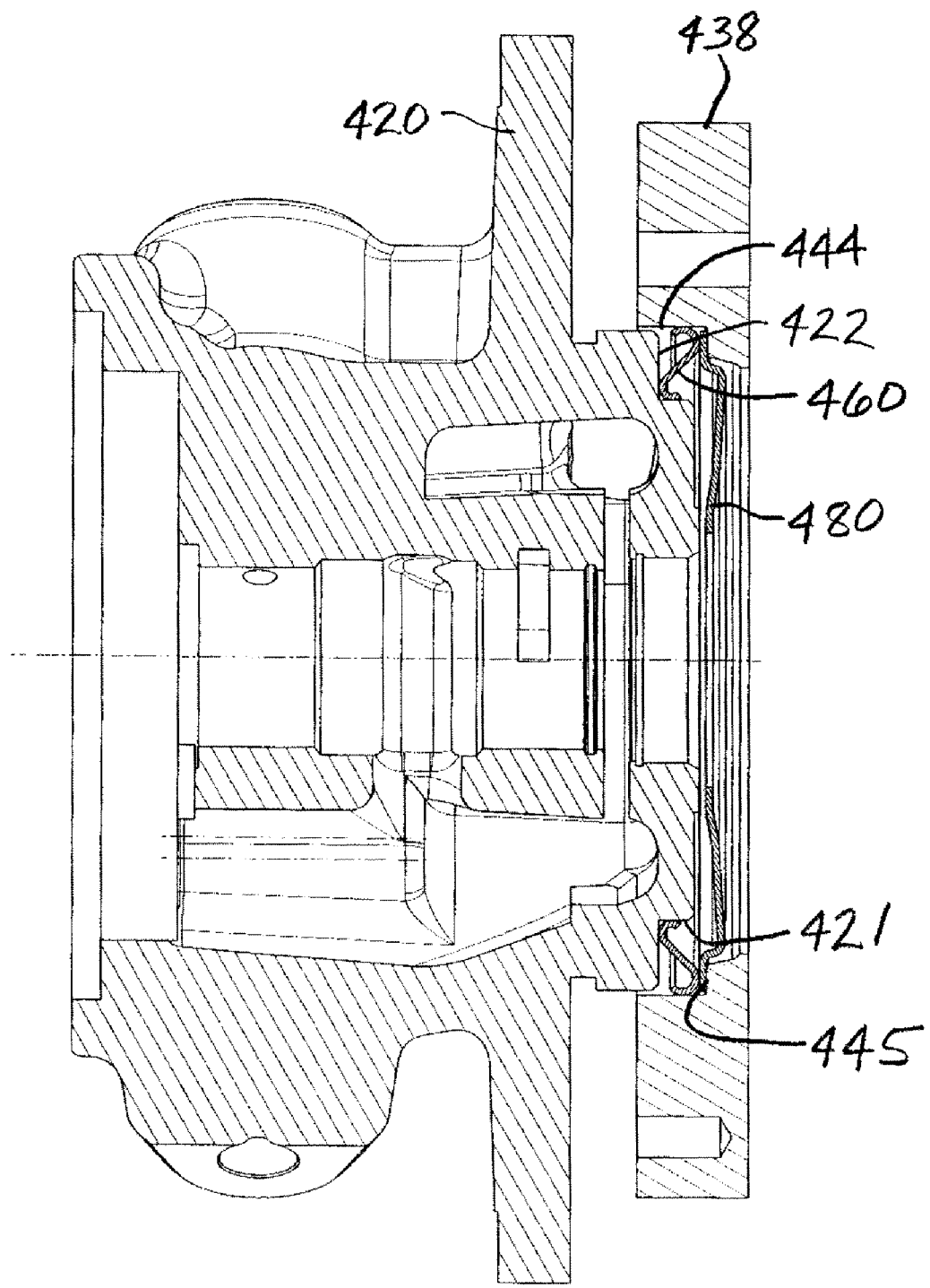
FIG. 10 is a fragmentary sectioned side view of a turbocharger in accordance with a fifth embodiment of the invention.

A fifth embodiment of the invention is shown in FIG. 10. A spring sleeve 460 is disposed between the radially inwardly facing surface 444 of the nozzle ring 438 and the radially outer surface 421 of the center housing 420. The spring sleeve comprises a 360° ring of an elastically deformable material such as spring steel or the like. The spring sleeve has a generally S-shaped cross-section, and thus has resilience in the radial direction when compressed radially and also has resilience in the axial direction when compressed axially. The center housing 420 defines a surface 422 that axially faces toward the nozzle ring 438 and extends radially out from and forms a corner with the radially outer surface 421 of the center housing. The nozzle ring 438 defines an opposite surface 445 that axially faces toward the center housing and extends radially in from and forms a corner with the radially inwardly facing surface 444. A heat shroud 480 is disposed between the nozzle ring and center housing and its radially outer periphery is sandwiched between a radially outer portion of the spring sleeve 460 and the axially facing surface 445 of the nozzle ring. A radially inner portion of the spring sleeve 460 engages the axially facing surface 422. The spring sleeve 460 is radially compressed between the radially facing surfaces 444, 421 of the nozzle ring and center housing respectively, and is axially compressed between the axially facing surfaces 445, 422 of the nozzle ring and center housing respectively. The spring sleeve thus provides radial centering of the nozzle ring relative to the center housing.

The outer periphery of the heat shroud 480 is axially compressed or captured between the spring sleeve and nozzle ring. However, unlike prior embodiments, the inner periphery of the heat shroud does not engage the center housing and thus the heat shroud is not elastically deformed. Accordingly, the heat shroud 480 need not be an elastically deformable structure, but can be substantially inelastic. The heat shroud 480 is referred to herein as an "unloaded" heat shroud, whereas the heat shroud 80 of prior embodiments is referred to as a "loaded" heat shroud.

Figure 11:
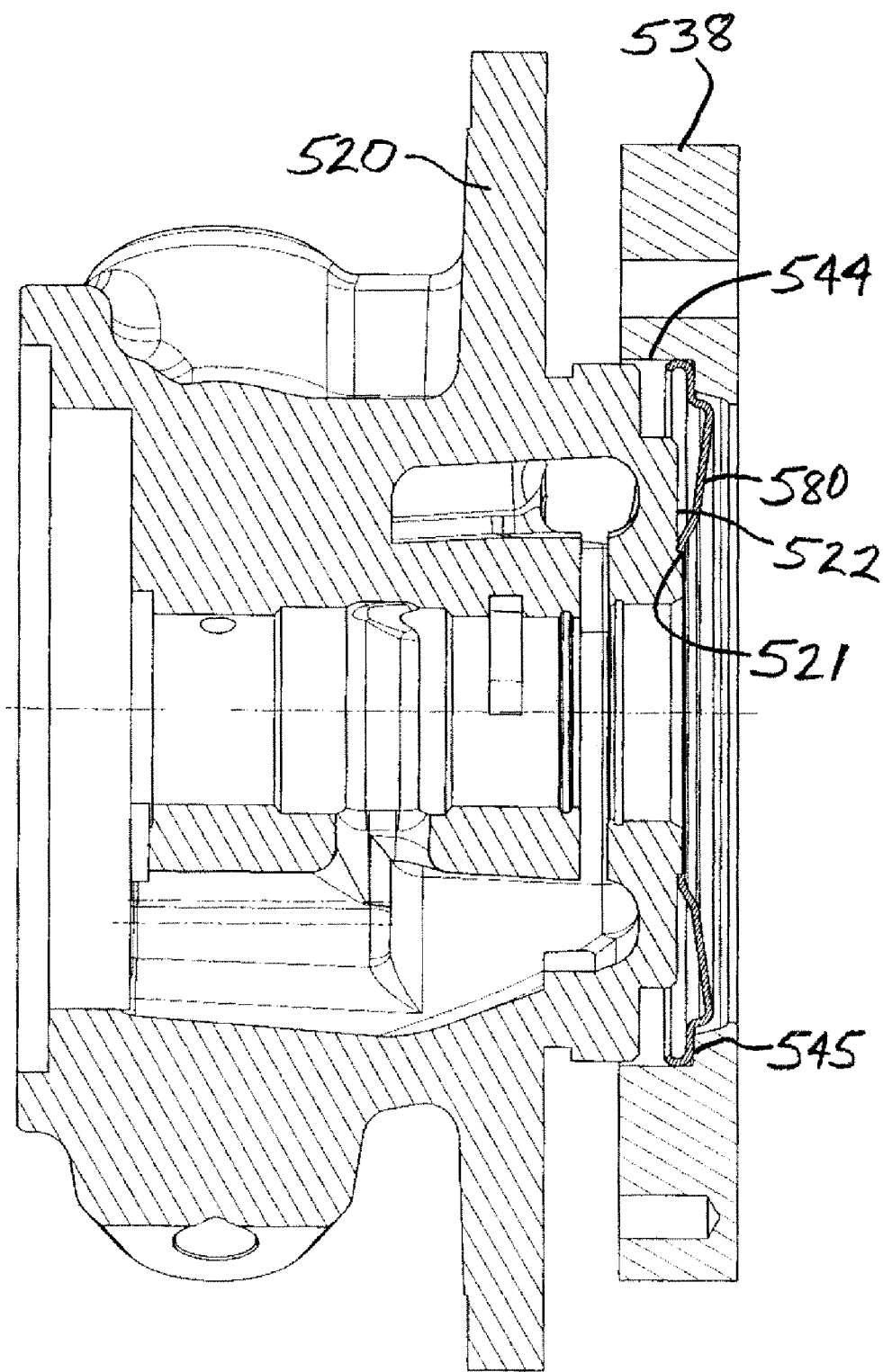
FIG. 11 is a fragmentary sectioned side view of a turbocharger in accordance with a sixth embodiment of the invention.

A sixth embodiment of the invention is depicted in FIG. 11. In this embodiment, the centering of the nozzle ring 538 relative to the center housing 520 is performed by an elastically deformable, loaded heat shroud 580. The nozzle ring defines a radially inwardly facing surface 544 and a surface 545 that axially faces the center housing and forms a corner with the radially facing surface 544. The outer periphery of the heat shroud 580 is engaged in this corner. The center housing similarly defines a radially outwardly facing surface 521 and a surface 522 that axially faces the nozzle ring and forms a corner with the radially facing surface 521. The inner periphery of the heat shroud 580 is engaged in this corner. The heat shroud is configured such that it is slightly radially compressed between the radially facing surfaces 544, 521 of the nozzle ring and center housing respectively, and is axially compressed and elastically deformed between the axially facing surfaces 545, 522 of the nozzle ring and center housing respectively. The heat shroud thus radially centers the nozzle ring relative to the center housing, and also provides sealing between these parts.

Figure 12:
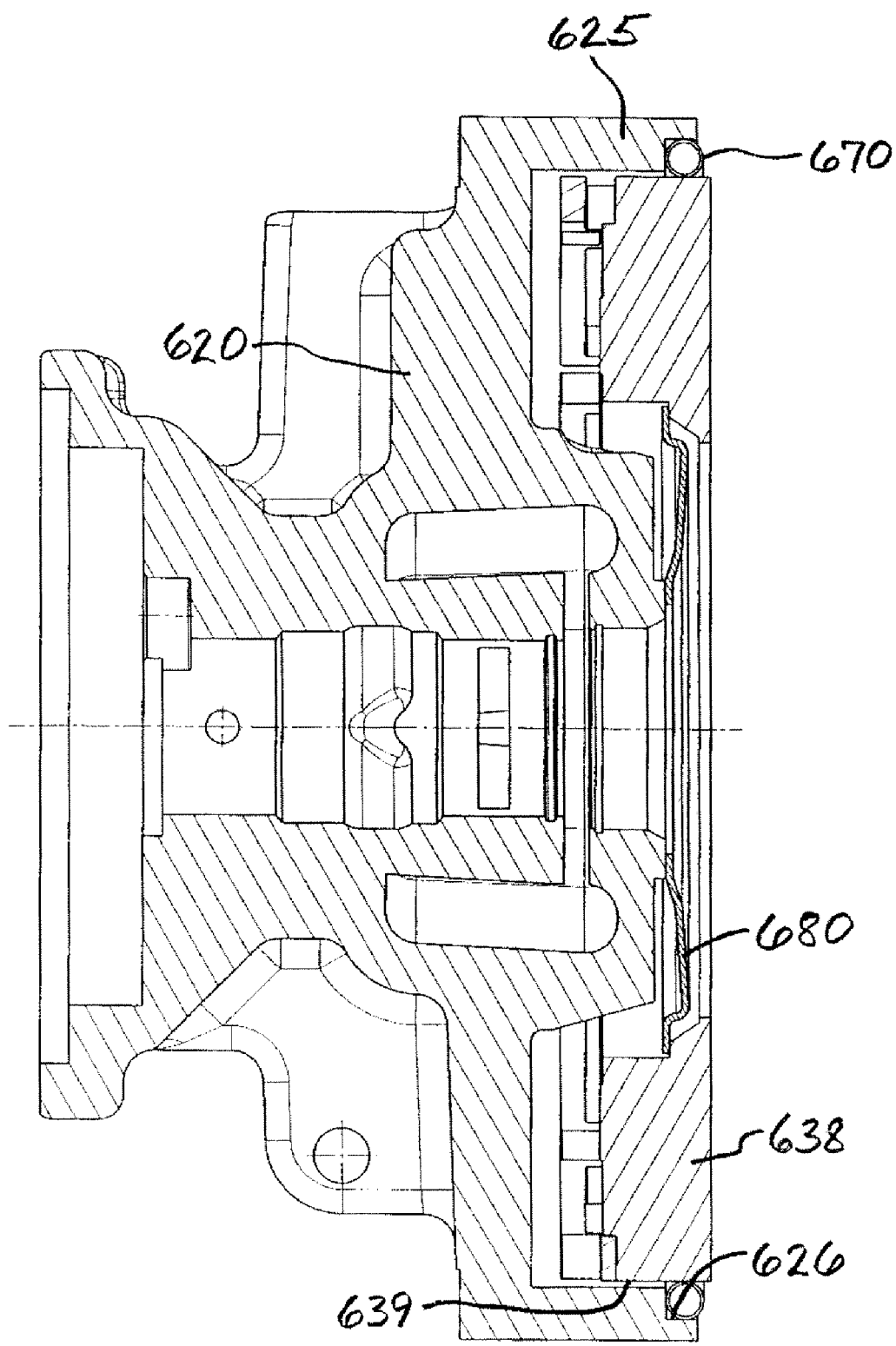
FIG. 12 is a fragmentary sectioned side view of a turbocharger in accordance with a seventh embodiment of the invention.

A seventh embodiment of the invention is illustrated in FIG. 12. In this embodiment, the center housing 620 includes an axially extending annular flange 625 that passes radially outwardly of the radially outer surface 639 of the nozzle ring 638. There is a radial gap between the flange 625 and the outer surface 639 of the nozzle ring. The flange defines a radially inner surface in which a circumferential recess or groove 626 is formed. A resiliently deformable seal ring 670 is disposed in the groove 626. The inner diameter of the seal ring in its relaxed state is smaller than the inner diameter of the flange 625 and slightly smaller than the outer diameter of the surface 639 of the nozzle ring. The nozzle ring 638 is inserted into the opening of the center housing 620 delimited by the flange 625 and this causes the seal ring 670 to be radially compressed between the radially outer surface 639 of the nozzle ring and the radially inner surface of the groove 626 in the flange 625. In this manner, the seal ring centers the nozzle ring relative to the center housing.

The seal ring 670 can comprise a metal ring that has a hollow circular cross-section as shown. Alternatively, the ring can comprise other materials and/or can have other cross-sectional shapes. The seal ring 670 not only provides radial centering of the nozzle ring but also provides sealing between the nozzle ring and center housing at the outer diameter of the nozzle ring. Sealing at the inner diameter of the nozzle ring can be provided by a loaded heat shroud 680 similar to previously described embodiments.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:
   a turbine assembly comprising a turbine housing and a turbine wheel mounted in the turbine housing and connected to a rotatable shaft for rotation therewith, the turbine housing defining a chamber surrounding the turbine wheel for receiving exhaust gas from an engine and for supplying the exhaust gas to the turbine wheel, the turbine assembly defining a nozzle leading from the chamber generally radially inwardly to the turbine wheel, the turbine housing further defining an axially extending bore through which exhaust gas is discharged after passing through the turbine wheel;

a compressor assembly comprising a compressor housing and a compressor wheel mounted in the compressor housing and connected to the rotatable shaft for rotation therewith;

a center housing connected between the compressor housing and the turbine housing; and a cartridge connected between the center housing and the turbine housing, the cartridge comprising an assembly of:

a generally annular nozzle ring and an array of vanes circumferentially spaced about the nozzle ring and disposed in the nozzle such that exhaust gas flows between the vanes to the turbine wheel, each vane being rotatably mounted to the nozzle ring and connected to a rotatable actuator ring such that rotation of the actuator ring rotates the vanes for regulating exhaust gas flow to the turbine wheel, wherein the nozzle ring includes a radially outer surface facing a radially inner surface of the turbine housing, and wherein a radial gap is defined between the radially outer surface of the nozzle ring and the radially inner surface of the turbine housing, the radial gap allowing radial displacement of the radially outer surface of the nozzle ring relative to the turbine housing;

an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion; and a plurality of spacers connected between the nozzle portion of the insert and the nozzle ring for securing the nozzle ring to the insert and maintaining an axial spacing between the nozzle portion of the insert and the nozzle ring;

wherein the turbine housing includes a surface directly contacting a surface of the nozzle ring that faces axially toward the insert for axially locating the nozzle ring relative to the turbine housing, and the nozzle ring is structured and arranged relative to the center housing such that radial locating of the nozzle ring is performed by the center housing.

2. The turbocharger of claim 1, wherein a radially inwardly facing surface of the nozzle ring directly contacts a radially outwardly facing surface of the center housing to radially locate the nozzle ring relative to the center housing.

3. The turbocharger of claim 2, wherein the radially inwardly facing surface of the nozzle ring is configured to reduce a contact area with the radially outwardly facing surface of the center housing.

4. The turbocharger of claim 3, wherein the radially inwardly facing surface of the nozzle ring defines a plurality of circumferentially spaced recesses, regions between the recesses defining the radially inwardly facing surface that contacts the radially outwardly facing surface of the center housing and provides radial centering of the nozzle ring relative to the center housing.

5. The turbocharger of claim 1, wherein the radially outwardly facing surface of the center housing is configured to reduce a contact area with the radially inwardly facing surface of the nozzle ring.

6. The turbocharger of claim 5, wherein the radially outwardly facing surface of the center housing defines a plurality of circumferentially spaced projections that project radially outward to contact the radially inwardly facing surface of the nozzle ring and provide radial centering of the nozzle ring relative to the center housing.

7. The turbocharger of claim 1, further comprising an elastically deformable heat shroud disposed between the nozzle ring and the center housing, an axially facing surface of the nozzle ring contacting an outer portion of the heat shroud proximate an outer diameter thereof and urging the heat shroud toward the center housing such that an inner portion of the heat shroud proximate an inner diameter thereof is urged against a surface of the center housing, the heat shroud being elastically deformed between the nozzle ring and center housing.

8. The turbocharger of claim 1, further comprising a ring-shaped sleeve disposed between the radially inwardly facing surface of the nozzle ring and the radially outwardly facing surface of the center housing, the sleeve having a radially inner surface contacting the radially outwardly facing surface of the center housing and having a radially outer surface contacting the radially inwardly facing surface of the nozzle ring so as to center the nozzle ring relative to the center housing.

9. The turbocharger of claim 8, wherein the sleeve defines a plurality of circumferentially spaced projections that project radially outwardly and define the radially outer surface that contacts the nozzle ring, the projections reducing a contact area with the nozzle ring.

10. The turbocharger of claim 9, wherein the sleeve at one circumferential location thereof defines a radially outwardly extending protuberance that extends out to a larger radius than the plurality of circumferentially spaced projections, the nozzle ring at one circumferential location thereof defining a recess for receiving the protuberance such that the nozzle ring is oriented in a predetermined circumferential orientation with respect to the sleeve.

11. The turbocharger of claim 10, wherein the sleeve and center housing define cooperative features that engage each other for orienting the sleeve in a predetermined circumferential orientation relative to the center housing.

12. The turbocharger of claim 1, further comprising a split compensating ring disposed between the radially inwardly facing surface of the nozzle ring and the radially outwardly facing surface of the center housing, the compensating ring having a radially inner surface contacting the radially outwardly facing surface of the center housing and having a radially outer surface contacting the radially inwardly facing surface of the nozzle ring so as to center the nozzle ring relative to the center housing.

13. The turbocharger of claim 12, wherein the compensating ring is radially undulating along the circumferential direction for reducing contact area with the nozzle ring and center housing.

14. The turbocharger of claim 1, further comprising an elastically deformable spring sleeve disposed between the radially inwardly facing surface of the nozzle ring and the radially outwardly facing surface of the center housing, the spring sleeve having a radially inner surface contacting the radially outwardly facing surface of the center housing and having a radially outer surface contacting the radially inwardly facing surface of the nozzle ring so as to center the nozzle ring relative to the center housing.

15. The turbocharger of claim 14, wherein the spring sleeve has a generally S-shaped cross-section.

16. The turbocharger of claim 14, wherein the nozzle ring defines an axially facing surface that faces the center housing, and the center housing defines an axially facing surface that faces the turbine wheel, and further comprising a heat shroud having a radially outer portion disposed between and contacting the spring sleeve and the axially facing surface of the nozzle ring.

17. The turbocharger of claim 16, wherein the spring sleeve is elastically deformed between the heat shroud and the axially facing surface of the center housing.

18. The turbocharger of claim 17, wherein the heat shroud is free from contact with the center housing.

19. The turbocharger of claim 1, further comprising a heat shroud providing shielding of the center housing from exhaust gas passing through the turbine, the heat shroud disposed between the radially inwardly facing surface of the nozzle ring and the radially outwardly facing surface of the center housing, the heat shroud having a radially inner surface contacting the radially outwardly facing surface of the center housing and having a radially outer surface contacting the radially inwardly facing surface of the nozzle ring so as to center the nozzle ring relative to the center housing.

20. The turbocharger of claim 19, wherein the nozzle ring defines an axially facing surface that faces the center housing, and the center housing defines an axially facing surface that faces the turbine wheel, and wherein the heat shroud engages the axially facing surfaces of the nozzle ring and center housing.

21. The turbocharger of claim 1, wherein the center housing includes an axially extending annular flange that passes radially outwardly of the radially outer surface of the nozzle ring, the flange defining a radially inner surface, and further comprising a seal member disposed between and contacting the radially outer surface of the nozzle ring and the radially inner surface of the flange so as to center the nozzle ring relative to the center housing.

22. The turbocharger of claim 21, wherein the seal member comprises a resiliently deformable seal ring.

23. The turbocharger of claim 22, wherein the seal ring is resiliently deformed in the radial direction between the radially outer surface of the nozzle ring and the radially inner surface of the flange.

\* \* \* \* \*